(12) United States Patent
Hertzog et al.

(10) Patent No.: US 7,962,150 B2
(45) Date of Patent: Jun. 14, 2011

(54) ULTRA-WIDEBAND RADIOS FOR TIME-OF-FLIGHT-RANGING AND NETWORK POSITION ESTIMATION

(75) Inventors: Claudia A. Hertzog, Houston, TX (US); Farid U. Dowla, Castro Valley, CA (US); Gregory E. Dallum, Livermore, CA (US); Carlos E. Romero, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1157 days.

(21) Appl. No.: 11/637,388

(22) Filed: Dec. 11, 2006

(65) Prior Publication Data

US 2010/0225541 A1    Sep. 9, 2010

Related U.S. Application Data

(63) Continuation-in-part of application No. 10/834,706, filed on Apr. 28, 2004, now Pat. No. 7,383,053.

(60) Provisional application No. 60/749,137, filed on Dec. 9, 2005.

(51) Int. Cl.
*H04Q 7/20* (2006.01)
(52) U.S. Cl. .................. 455/456.1; 455/456.2; 340/10.1
(58) Field of Classification Search .............. 455/456.1, 455/456.2, 456.3, 456.4, 456.5, 456.6; 340/10.1
See application file for complete search history.

(56) References Cited

U.S. PATENT DOCUMENTS

| | | | |
|---|---|---|---|
| 4,370,748 A | 1/1983 | Janc et al. | |
| 5,510,800 A | 4/1996 | McEwan | |
| 6,054,950 A | 4/2000 | Fontana | |
| 6,133,876 A | 10/2000 | Fullerton et al. | |
| 6,466,168 B1 | 10/2002 | McEwan | |
| 6,611,234 B2 | 8/2003 | Fullerton et al. | |
| 6,707,424 B1 | 3/2004 | Snyder et al. | |
| 6,839,027 B2 * | 1/2005 | Krumm et al. | 342/465 |
| 2003/0144010 A1 | 7/2003 | Dollinger | |
| 2005/0136972 A1 * | 6/2005 | Smith et al. | 455/554.1 |
| 2008/0186136 A1 * | 8/2008 | Raphaeli et al. | 340/10.1 |

\* cited by examiner

*Primary Examiner* — Charles Shedrick
(74) *Attorney, Agent, or Firm* — John P. Woolridge (57) ABSTRACT

This invention provides a novel high-accuracy indoor ranging device that uses ultra-wideband (UWB) RF pulsing with low-power and low-cost electronics. A unique of the present invention is that it exploits multiple measurements in time and space for very accurate ranging. The wideband radio signals utilized herein are particularly suited to ranging in harsh RF environments because they allow signal reconstruction in spite of multipath propagation distortion. Furthermore, the ranging and positioning techniques discussed herein directly address many of the known technical challenges encountered in UWB localization regarding synchronization and sampling. In the method developed, noisy, corrupted signals can be recovered by repeating range measurements across a channel, and the distance measurements are combined from many locations surrounding the target in a way that minimizes the range biases associated to indirect flight paths and through-wall propagation delays.

16 Claims, 7 Drawing Sheets

ULTRA-WIDEBAND RADIOS FOR TIME-OF-FLIGHT-RANGING AND NETWORK POSITION ESTIMATION

RELATED APPLICATIONS

This application is a Continuation-in-Part of application Ser. No. 10/834,706 entitled "Position Estimation of Transceivers in Communication Networks," filed Apr. 28, 2004 now U.S. Pat. No. 7,383,053, and the present application also claims priority from U.S. Provisional Patent Application No. 60/749,137, entitled "Ultra-Wideband Radios For Time-Of-Flight-Ranging and Network Position Estimation," filed on Dec. 9, 2005, both of which are incorporated by reference in its entirety.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a position determination. More specifically, the present invention provides a position estimation system and method by a wireless communication network.

2. State of Technology

The maturing of integrated circuitry, micro-electromechanical systems (MEMS) and communication theory has precipitated the emergence of wireless networks and has led to the economic and computational feasibility of networks having a large number of self-sufficient and/or reliant nodes. Each node can be designed to, for example, sense elements of its environment, perform simple computations, and/or communicate with peer groups or directly to an external interrogator. In wireless network applications such as environmental monitoring of ground water or airborne chemicals, firefighters in buildings, or soldiers in caves, it is desirable to know the location of such network nodes independent of, for example, a Global Positioning System (GPS).

Background information on an existing technology that computes estimates of unknown locations of, for example, a radio terminal or a radio tag emitting a signal can be found in, U.S. Patent No. 2003/0174086 A1, titled "Determining a Time of Arrival of a Sent Signal," issued Sep. 18, 2003 to Hirt, including the following: "The present invention provides a solution for determining a time of arrival $t_n$, abbreviated to TOA, and if desirable, the absolute TOA, of one or a plurality of signals emitted by one or a plurality of transmitters, e.g. terminals or radio tags, and receivable at different location of known spatial coordinates. In particular, the solution is based on measuring and comparing the total signal transfer time (TSTT) of signals, in such a way that explicit knowledge of absolute time or absolute time synchronization between components located at different spatial positions is not required."

Background information on a system and method that utilizes peer-to-peer proximity measurements together with a known geographical position can be found in, U.S. Pat. No. 6,473,038 B2, titled, "Method and Apparatus for Location Estimation," issued Oct. 28, 2002 to Patwari et al., including the following: "a system and method operate to provide location estimates for mobile devices. The system does not require a great deal of installed infrastructure. Moreover in the case of urban canyons and inside buildings where there are numerous obstructions to the propagation of signals (e.g., GPS signals), the system is able to function to provide location information for devices that might otherwise be out of range."

Background information on a system that utilizes Ultra Wideband (UWB) or short pulses to estimate the position of a receiver by measuring the one-way flight time of a pulse sent from multiple independent transmitters can be found in, U.S. Pat. No. 6,054,950, titled, "Ultra Wideband Precision Geolocation System," issued Apr. 25, 2000 to Fontana, including the following, "The system includes a set of N (where N>2) untethered UWB transceivers located at fixed positions, an untethered UWB receiver at the target, and a processor at the target for resolving time-of-flight measurement ambiguities of received pulses to determine precise geolocation by solving a set of equations according to time-of-flight measurements and surveyed positions of N−1 transceivers."

Background information on a system that utilizes transmitted and received pulse trains to measure distances between radio devices can be found in, U.S. Pat. No. 6,674,396 B2, titled, "System and Method For Distance Measurements by Inphase and Quadrature Signals in A Radio System," issued Jan. 6, 2004 to Richards et al., including the following, "the key to measuring a distance according to the present invention is to precisely measure the time it takes for a single bit to travel from a first radio transceiver to a second radio transceiver. Since in reality it is difficult to transmit and receive a single bit, the distance is measured by determining the time it takes a pulse train to travel from a first radio transceiver to a second transceiver and then from the second radio transceiver back to the first radio transceiver. Stated in other terms, the distance is measured by determining the travel time for a complete exchange of data between the first and second radio transceivers."

Background information on a system that utilizes beacons to determine a location of mobile units can be found in, U.S. Patent No. 2003/0028323, titled, "Material Handling Systems with High Frequency Radio Location Devices," issued Feb. 6, 2003 to Zeitler et al., including the following, "A material handling system uses high-frequency location devices for determining the location of mobile units, such as AGV's, overhead mono-rails, conveyor components, or individual articles being transported by such devices . . . The location devices work in cooperation with a number of stationary location devices, such as beacons, that are positioned within the environment at known locations, such as in or adjacent the ceiling of the workplace environment."

Accordingly, the present invention provides a wireless localization solution by a method and system that includes statistical processing of time of flight information to estimate a position of a receiving device.

SUMMARY OF THE INVENTION

Accordingly, the present invention provides a wireless position estimation method that includes statistically filtering time of flight information resulting from replies to queries to produce a plurality of range measurements; and calculating a position estimate as a result of processing a predetermined collected number of filtered range measurements.

Another aspect of the present invention is to provide a wireless position estimation method that includes: transmitting from one or more known positions a plurality of queries; continuously collecting a plurality of replies from one or more receivers upon receipt of the plurality of queries; filtering time of flight information resulting from the transmission and the one or more replies to produce a plurality of range measurements; wherein the filtering includes a two-stage statistical analysis; and calculating a position estimate of each of the one or more receivers as a result of a predetermined collected number of filtered range measurements from the one or more known positions.

Another aspect of the present invention provides a position estimation wireless system that includes at least one receiver and one or more transmitters arranged from known positions and capable of transmitting a plurality of said wireless queries; wherein statistically filtering of wireless replies produce a plurality of range measurements that can be further utilized to calculate a position estimate to locate unknown receivers.

Accordingly, the invention provides a wireless localization solution by a method and system that includes statistical processing of time of flight information to estimate a position of a receiving device. Such an invention can be applied in sensor network applications, such as environmental monitoring of water in the soil or chemicals in the air where the position of the network nodes is deemed critical. Moreover, the present invention can be arranged to operate in areas where a Global Positioning System (GPS) is not available, such as inside buildings, caves, and tunnels.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Referring now to the following detailed information, and to incorporated materials; a detailed description of the invention, including specific embodiments, is presented. The detailed description serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

A network as disclosed herein, often includes transmitter and receiver nodes distributed randomly within a predetermined area depending upon the ranging capabilities of the utilized wireless communication frequency bands, e.g., IEEE, Ultra-Wideband, etc. Transmitters in the present invention have known positions via, for example, satellites or other methods known in the art, while receivers have unknown positions. Generally, transmitters can determine receiver(s) position through time-of-flight ranging and information sharing.

The present invention provides a closed-form (i.e., an exact mathematical solution) two or three dimensional position estimation method and system to determine one or more receiver(s) positions of down to less than about 20 feet, more often down to about one foot in distance by combining multiple round trip time of flight measurements collected by one or more transmitters, often at least four transmitters communicating in a wireless network with such receivers. Such a localized position estimation method and system is provided by statistically monitoring time durational interaction, i.e., time-of-flight, of devices, such as, but not limited to, cell phones, pagers, personal identification cards, laptops, and Personal Digital Assistants (a handheld personal computer, e.g., an iPAQ manufactured by Hewlett Packard/COMPAQ), having wireless communication circuitry embedded in their framework.

Specific Description

Figure 1:
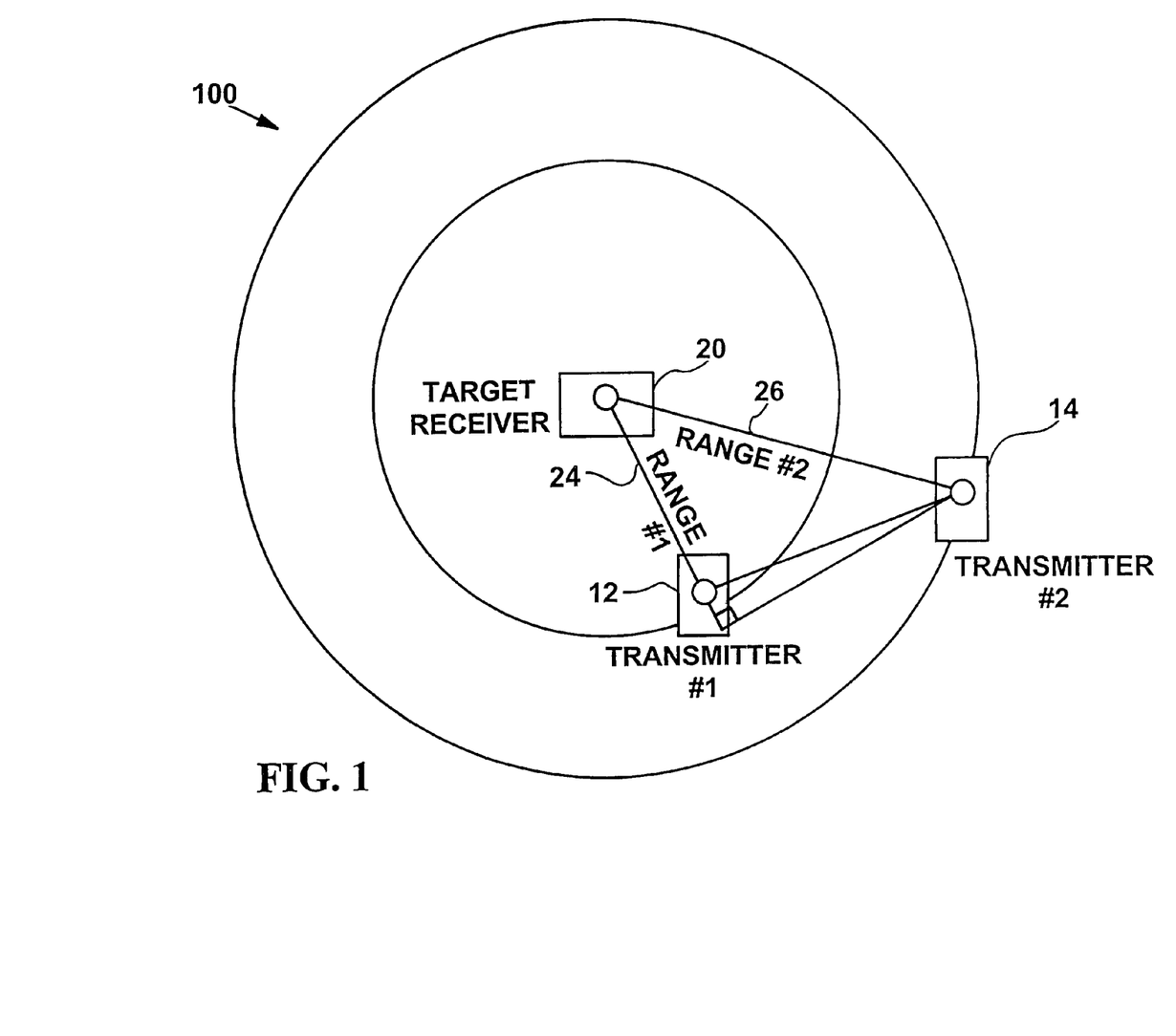
FIG. 1 shows a graphical representation of the position estimation system of the present invention.

FIG. 1 shows an example of a system, generally designated by the reference numeral 100, designed around an infrastructure of devices, which are capable of wireless network communication. FIG. 1 graphically illustrates a pair of hand-held transmitters 12, 14, such as, but not limited to iPAQ's, operating within such a system, for example, a large area wireless network (LAN), arranged to find an unknown receiver 20 position, such as a laptop computer as depicted in FIG. 1, capable of replying to one or more wireless protocol queries produced by transmitters 12, 14. From such an example arrangement, a first range measurement 24 and a second range measurement 26, produced by wireless communication statistically analyzed time-of flight data (denoted by d), are combined in such a way using the Pythagorean Theorem (PT) to calculate, using a closed-form least squares method, a position estimate of receiver 20. Such a closed-form calculation method is disclosed in "Closed-Form Least Squares Source Location Estimation from Range-Difference Measurements," by J. Smith and J. Abel, IEEE Transactions on acoustics and Speech vol. ASSP-35, no. 12, pp. 1661-1669, 1987, herein incorporated by reference in its entirety. Although two detectors are shown in the illustrated example of FIG. 1, more often a minimum of at least three transmitters and a minimum of at least three range measurements are utilized in the present invention to determine a unique receiver position and so as to eliminate ambiguity in the position estimation method as disclosed herein.

As a beneficial wireless communication embodiment, system 100, as shown in FIG. 1, can include Ultra Wideband (UWB) communication interfaces. In UWB communication systems, pulses are often transmitted as a sequence of impulses; wherein there is no carrier frequency. There is no specific frequency associated with this technique; rather, its frequency spectrum is related by, for example, the Fourier transform of the pulse and can generally span hundreds of megaHertz to several gigaHertz. It is inherently spread-spectrum. Such a technique spreads the signal so that it overlays any other signals in its bandwidth. But the key to utilizing such a technique is its very low power level, which makes it appear as noise to most other narrowband or spread-spectrum equipment.

The same pulse shape can be transmitted and modulated based on, for example, changing amplitude, position, or time separation between the pulses for a number of respective channels. In addition, the free-space radiated pulse may have a pulse-width of about 5 ns or less, often about 1 ns or less, and more often less than about 200 picoseconds wide with average power levels of up to about 5 mW. When utilizing beneficial transmitted pulse durations of less than about 200 picoseconds, range determinations can easily be resolved to less than about one foot by the methods of the present invention. To achieve such accuracy on the order of less than about one foot, transmitters and receivers of the present invention can be designed to each have orthogonal binary identification (ID) codes. In such an arrangement, a transmitter can send its encoded UWB signal to a receiver in the form of an electronic query, which is capable of replying with the exclusive-or of the transmitter and receiver codes. On receiving a wireless reply, the transmitter can extract the receiver ID code and time-of-flight information to calculate a range of the receiver node. Orthogonal codes can be utilized to provide unique radio identity allowing ranging to take place as accurately as possible within the physical layer so as to not rely on software timing.

In an additional arrangement, system 100, as shown in FIG. 1, may include commercial wireless interfaces, such as but not limited to, infrared and/or microwave technologies operating at, for example, about the 2.4 GHz and 5 GHz bands, which allows integration into such personal devices, (e.g., iPAQ's, cell phones, etc.) and thus capable of being implemented into the present invention. For example, a wireless network, such as Bluetooth, a registered trademark of Bluetooth SIG, INC., Corporation by Assignment, Delaware, located in Washington D.C., may be used in the position estimation system and method of the present invention. Such a technology is built into a small microchip and operates in a globally available frequency band (i.e., 2.4 GHz), ensuring communication compatibility worldwide. Bluetooth, incorporating a radio transceiver such as a microchip, is capable of being integrated into the personal devices of the present invention to facilitate fast and secure transmission of data, even when the devices are not within line of sight.

As another example embodiment, a wireless technology, such as, but not limited to, International Electronic and Electrical Engineers (IEEE) 802.11a or IEEE 802.11b, may additionally be incorporated into the present invention as the wireless standard based on its present common use in both business and home environments that enables users high-speed access to networks and the Internet while roaming throughout an area. Moreover, several new IEEE protocols for wireless communication, such as, but not limited to, an UWB physical layer (PHY) option in the IEEE 802.15.3 Personal Area Network (PAN) standard that can support data rates of up to 110 Mbits/s over a range of 10 m, and others, are also ready for introduction for use in wireless systems and may be considered as a protocol for the wireless standard of the present invention.

As an example method embodiment using such IEEE technology, each transmitter 12, 14, and receiver 20, as shown in FIG. 1, equipped with, for example, an IEEE 802.11b Wireless LAN PC Card, capable of operating at a frequency of 2.4 GHz with a maximum data rate of 11 Mbps, can be arranged to exchange queries and responses so as to compute and store time-of flight data between such devices. Each query can be in the form of, but not limited to, a "PING signal," i.e., a type of wireless signal transmitted from a first interactive wireless device in order to obtain information from other interactive wireless devices within a predetermined range of the first device. However, PING is a high level protocol having a low priority in a CPU stack, which therefore can reduce the accuracy of collected time-of-flight measurements because of computer timing issues. In addition, PING requires full cooperation from a receiver nullifying a possibility of finding an out-of-compliance network node. Therefore, although PING may be implemented into the framework of the present invention, a beneficial communication protocol is to replace PING with a communication protocol on the physical-layer, e.g., using a IEEE 802.15.3 (PAN) standard as discussed above, or a medium access control (MAC) layer. Such communication protocols can solve CPU stack-priority issues and can enable communication in a non-cooperative environment.

For every query, such as for example, a PING or a MAC level query, issued by a predetermined transmitter, such a transmitter can receive a batch of as one example, 50 replies verifying a connection and noting an elapsed time. As each batch of replies arrives, received information is directed through two stages of statistical filtering to extract a real query time, since signal multi-path and unknown computer processing time can impart substantial variation within a batch and between batches.

Measurement Filtering

Figure 2A:
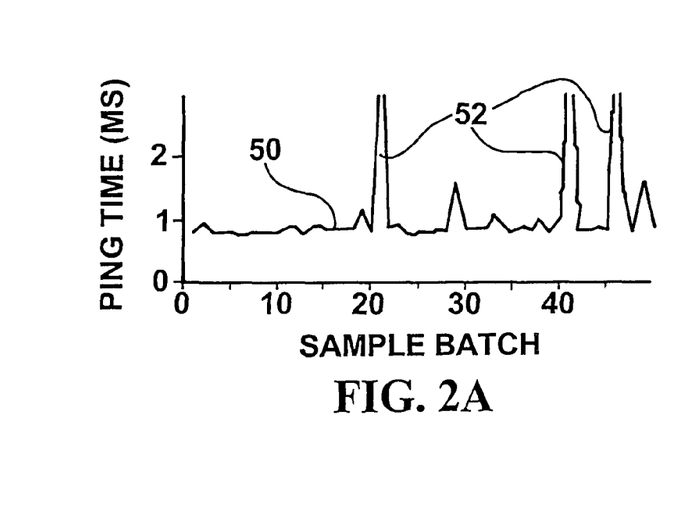
FIG. 2(a) illustrates a batch of received data that includes disproportionate spikes of data outliers shown.

FIGS. 2(a), 2(b), 2(c), and 2(d), graphically illustrates the filtering stage method of the present invention designed to remove data outliers to enable calculation of a single scalar distance measurement. FIG. 2(a) shows a batch 50 of received data having such data outliers, shown as disproportionate spikes 52. Each batch 50 of data, as shown in FIG. 2(a) is then sent through two stages of filtering to extract the real query time, shown in this example as the PING time.

Figure 2B:
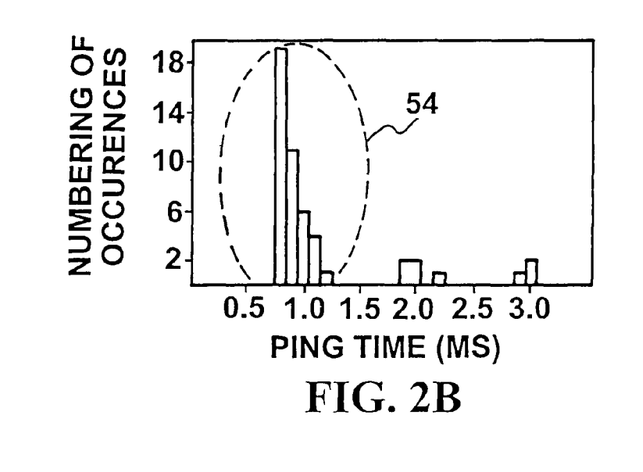
FIG. 2(b) shows a histogram of the received data grouped into 100 μsec bins.
Figure 2C:
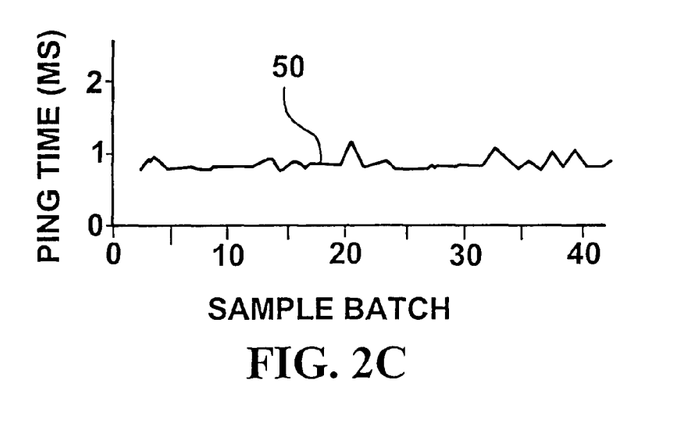
FIG. 2(c) shows the received data plotted without the data outliers.

In the first filter stage, batch 50 of received data, as shown in FIG. 2(a), is distributed in a histogram, as shown in FIG. 2(b), having predetermined bin widths, e.g., the 100 μsec bin widths as shown in FIG. 2(b). A primary subset 54 of the received data, shown encircled by the dashed lines, is extracted and re-plotted, as shown in FIG. 2(c), leaving the data in this example within a range of approximately 100-300 μsec, as opposed to the original 5 ms range, as shown in FIG. 2(a).

A second filter stage includes a recursive weighted least-squares (WLS) estimator capable of predicting a true value of a variable given sequential batches of "noisy" (e.g., data outliers) variable measurements over time. Such a filter works recursively by updating the least-squares solution after every new batch of data arrives. For an example query, such as a PING, issued at the $k^{th}$ sampling interval, a batch of m new measurements $z_k$ is received and the PING time at the next interval $z_{k+1}$ is estimated and called $\hat{z}_{k+1}$. To achieve this, $Z_k$ is assumed to have the form:

$$\hat{z}_k = Hx_k + n_k; \quad (1)$$

where $$H = \begin{bmatrix} 1 & t_1 \\ \vdots & \vdots \\ 1 & t_m \end{bmatrix}.$$

Assuming a first-order system of constant velocity, the matrix H defines the behavior of the system, the vector $n_k$ is the residual measurement error, and $\Box t = t_n - t_{n-1}$ is the sampling time. Accordingly, the WLS solution to equation (1) is:

$$\hat{x}_k = \hat{x}_{k+1} + K_k(z_k - H\hat{x}_{k+1}); \quad (2)$$

which is the estimate $x_k$ of that minimizes a quadratic cost function of residual error and includes the previous estimate plus the residual error scaled by a gain matrix.

Such a gain matrix of the present invention is:

$$K_k = P_{k-1} + H^T(HP_{k-1}H^T + R_k)^{-1}; \quad (3)$$

where $P_k$ is the error covariance matrix representing the error after the kth estimate;

$$P_k = (P_{k-1}^{-1} + H^T R_k^{-1} H)^{-1}. \quad (4)$$

Finally, some of the measurements are presumed better than others and a "weighting matrix" $R_k$ is defined, which is proportional to each new measurement's variation from the previous estimate, or:

$$N_k = I \otimes z_k - I\hat{z}_{k-1}; \text{ and} \quad (5)$$

$$R_k^{-1} = (N_k^T N_k)^{-1} = \begin{bmatrix} \frac{1}{(z_{k1} - \hat{z}_{k-1})^2} & 0 & 0 \\ 0 & \ddots & 0 \\ 0 & 0 & \frac{1}{(z_{k1} - \hat{z}_{k-1})^2} \end{bmatrix}; \quad (6)$$

where the operator $\otimes$ is an element-by-element product of the measurement vector $z_k$ with the identity matrix, resulting in a diagonal matrix of measurement values. Such weights can "reward" points that are more closely equal to the previous estimate in a feedback operation.

Figure 2D:
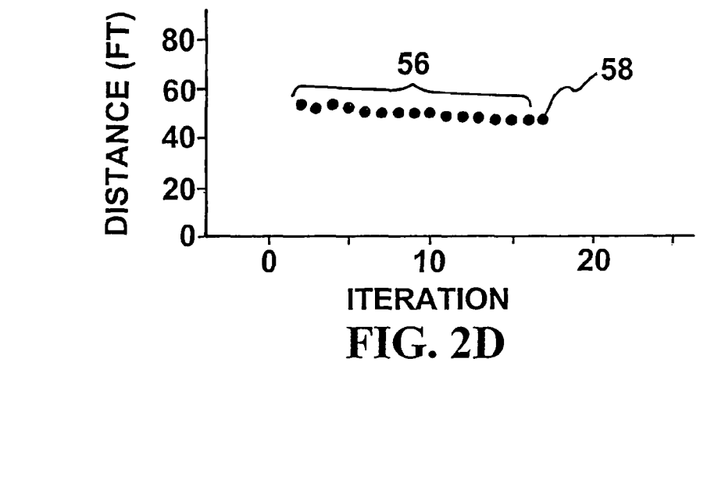
FIG. 2(d) shows a plot of single scalar distance points of the received data after weighted least squares (WLS) filtering.

Returning back to the figures, FIG. 2(c) shows batch 50 of received data plotted with data outliers 52 of FIG. 2(a) removed by the first filter stage. FIG. 2(d) shows a plot of distance versus iteration of the results of the second WLS filtering stage, having single scalar points 56 plotted as calculated by equations (1)-(6) with a final single scalar point 58 plotted as the most recent update.

Generating Position Estimates

Each transmitter of the present invention can be designed to utilize a structured graphical user interface (GUI) non-commercial, commercial, or modified commercial software package such as, for example, MATLAB, to operate as a communications infrastructure and enable such transmitters to share received most current filtered range measurements, R*, associated with each receiver. Range estimate is the round-trip time of flight (TOF) filtered using the methods as discussed above multiplied by the velocity of the signal (the speed of light). With enough R*'s, a final converged position estimate of a system network can be calculated using the closed-form method of equations (5) and (6), with a position estimate of a receiver value using the methods of the present invention converging to and remaining at a settled value after a predetermined time, such as, for example, about 1000 time-steps (e.g., one minute sampling at 10 ms).

Ranging Accuracy and Additional Transmitters

Figure 3:
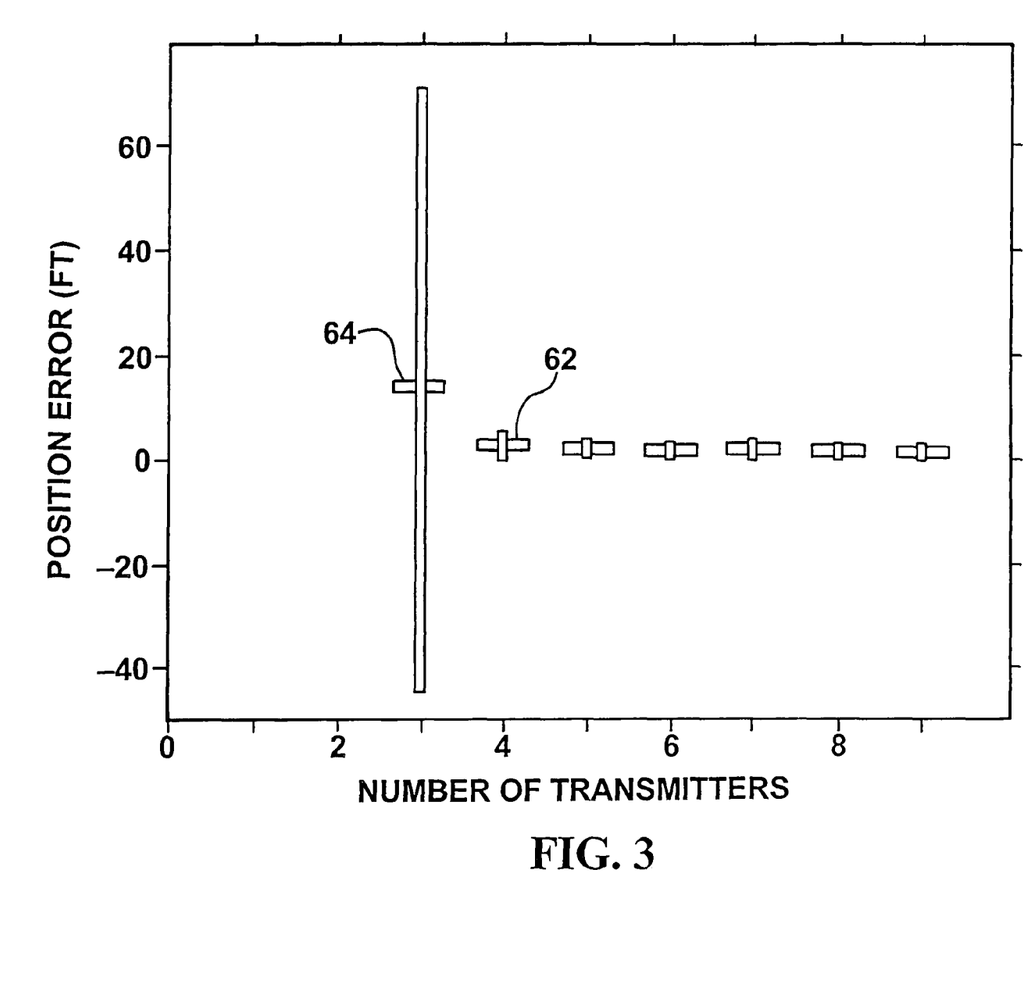
FIG. 3 shows an error bar plot of position error of the mean and mean plus standard deviation as a function of number of transmitters.

FIG. 3 shows an error bar plot of position error of the mean (shown as horizontal darkened rectangles) and mean plus standard deviation (shown as vertical non-darkened rectangles) as a function of number of transmitters (i.e., three to nine transmitters and one receiver) than can be utilized in an example-simulated network of the present invention using IEEE technology. FIG. 3 thus shows that by increasing the number of transmitters to four 62, mean position error decreases by up to about 20 feet from three transmitters 64 in this example, and measurement confidence increases (with a standard deviation decrease) by up to about 60 feet.

Figure 4:
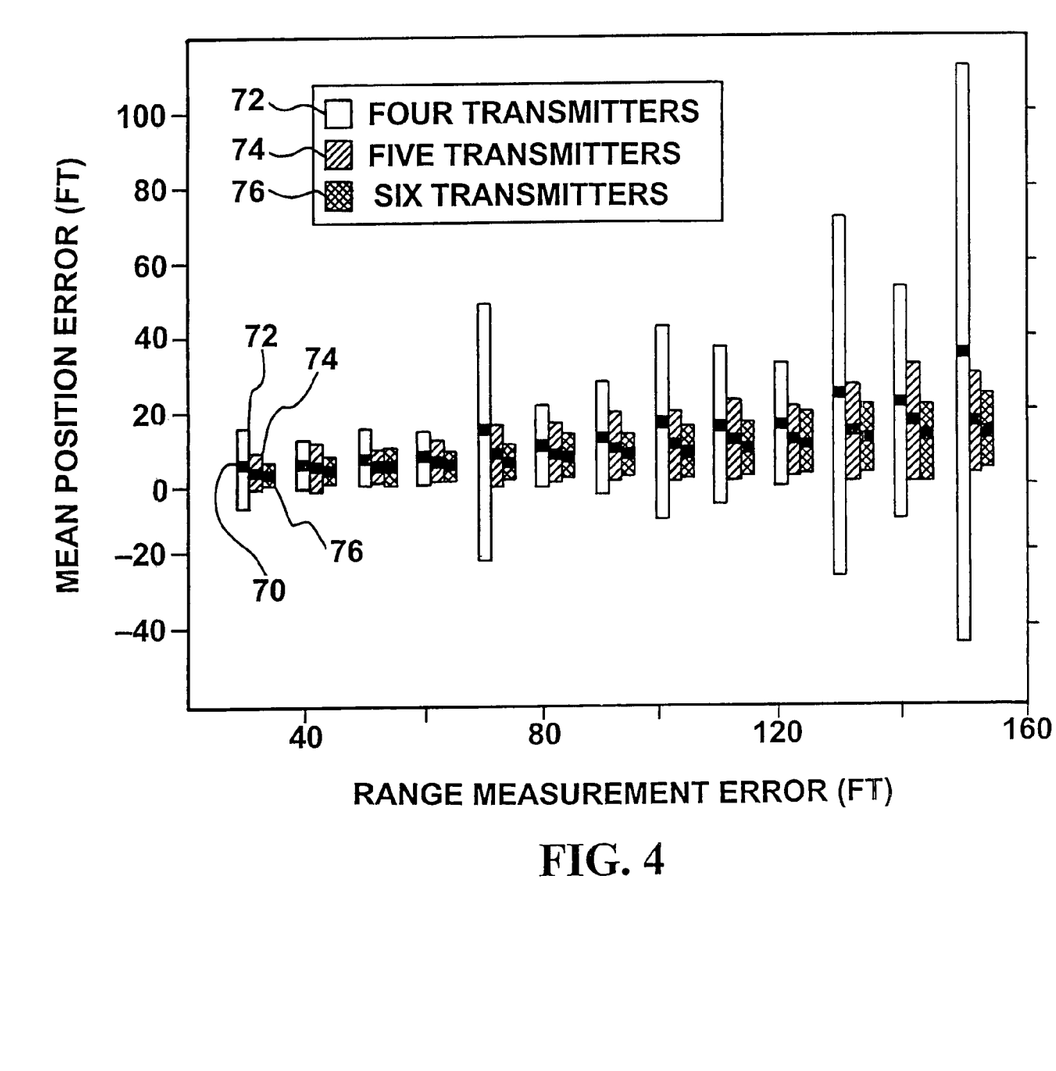
FIG. 4 shows mean position error data collected in the example simulation by varying mean range measurement error and a number of transmitters.

FIG. 4 shows mean position error data collected in the example simulation by varying mean range measurement error along with a predetermined number of transmitters to find an overall correlation between the three. The plot illustrates the impact on mean position error by varying both the mean 70 (shown as dark filled boxes) and the standard deviation having four transmitters 72 (shown as clear rectangles) and one receiver, five transmitters 74 (shown as diagonal line filled rectangles) and one receiver, and six transmitters 76 (shown as mesh filled rectangles) and one receiver. Such a plot shows that confidence in four transmitters, rather than three, when range measurement error is kept below about ±60 ft.

Ultra-Wideband Radio Synchronization

By measuring the round-trip Time-of-Flight (TOF) between one or more tracking radios (e.g., a transmitter) and one or more remote radios (e.g., a receiver) of the present invention, time synchronization is substantially eliminated. In the method of the present invention, a radio tracking unit sends an encoded pulse stream (i.e., a query) so as to request a response from one or more radio remote units. Such one or more radio remote units receive the encoded request stream and responds with one or more respective uniquely encoded reply pulse stream(s) (e.g., a reply batch). The one or more radio tracking unit(s) receives and time stamps the one or more replies to find elapsed round-trip travel time and thus distance. Each of the one or more remote radio unit(s) spends a small amount of processing time between receiving the request pulse and responding with a unique reply pulse, a time frame which can potentially introduce an error in distance. However, the present invention minimizes such errors by restricting the processing of information to within the on-board hardware so as to well-define the processing time, which results in a small variance that can be subtracted out with only a negligible error.

Figure 5:
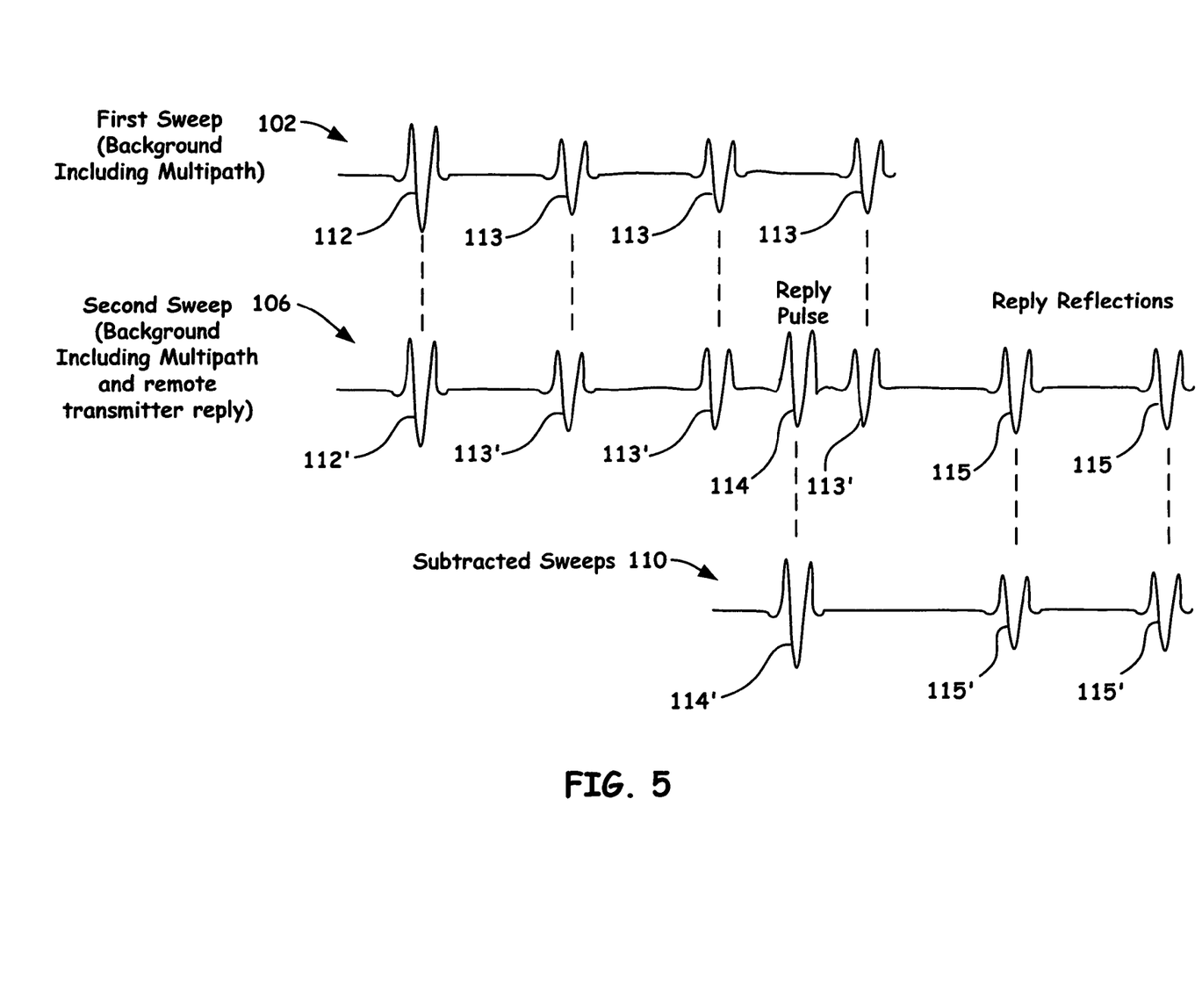
FIG. 5 shows a graphical representation of background subtraction to mitigate simultaneous transmission of the request stream while listening for a target response.

FIG. 5 shows an example (using a single pulse instead of a plurality of pulses as the request stream) additional step for background subtraction to mitigate simultaneous transmission of the request stream while listening for a target response. During a first sweep 102, a main tracking unit (not shown) sends a pulse 112 while simultaneously listening for it along with one or more of its reflections 113 while the main tracking unit remains silent. In the second sweep 106, main tracking unit repeats the pulse 112' with one or more remote units (not shown) activated to respond which again results insubstantially similar one or more reflections 113', however now a reply pulse 114 and one or more reply reflections 115 results in addition to the background pattern as shown in first sweep 102. Since the background, as shown in sweep 102, is present in sweep 106, the main tracking unit can subtract out the common signals so as to process a desired reply pulse 114' (which is to be used for the time-of-flight calculation) and reply reflections 115' as shown in subtracted sweep 110 in FIG. 5.

Recovering an UWB Pulse

Ranging accuracy highly depends on being able to resolve the exact arrival time of the incoming signals. In harsh ranging environments, in buildings, caves, or urban canyons, the signals are forced to travel though walls or around corners along a non-line-of-sight (NLOS) transmission channel. Ultra-wideband (UWB) signals provide enough frequency diversity to allow portions of the signal to penetrate walls and buildings, but traveling through structures stretches and distorts the original pulse, the signal-to-noise ratio deteriorates, transmitting hardware provides additional distortions, and the incoming signal is closely trailed by reflected versions of itself. Finding the once sharp pulses now buried within the noise floor becomes significantly more challenging.

A beneficial approach to recover a UWB pulse is to repeat range measurements many times so that a predetermined tracking unit can capture multiple copies of the highly correlated remote reply pulse 114', as shown in the subtracted sweep 110 in FIG. 5, buried within uncorrelated noise. Such a group of range measurements termed a "range collection," transforms a range collection into a coherent signal by use of a stacking technique of the present invention, i.e., beamforming, wherein a predetermined tracking unit combines the duplicate range measurements into one single distance estimate.

Figure 6A:
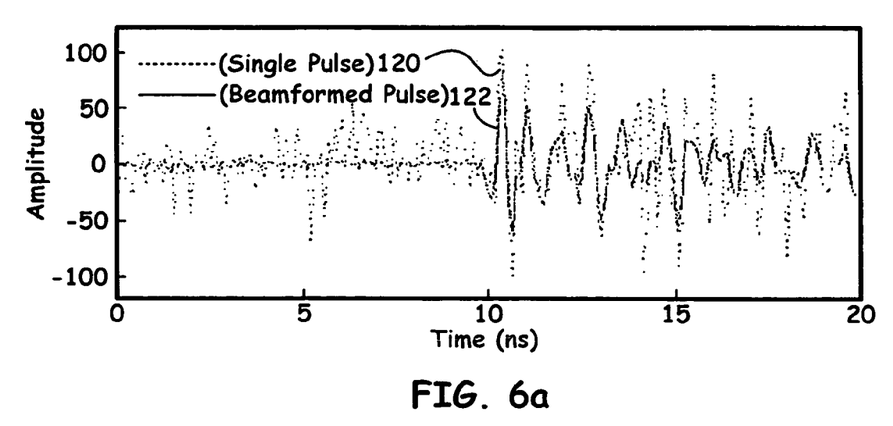
FIG. 6a shows a plot of amplitude versus time of a single non-line-of-site (NLOS) range measurement.

FIG. 6a shows a plot of amplitude versus time of a single non-line-of-site (NLOS) range measurement of the present invention in a volcanic rock cave with a beamformed range collection in the same conditions. As shown, only a slightly discernable pulse is seen with a single pulse signal 120 (shown as a dotted line), but by beamforming a plurality of frames, such as, but not limited up to about to 100 frames or a greater number, to result in a beamformed pulse 122, as shown in the data of FIG. 6a, uncorrelated noise can be minimized so as to clearly define a desired pulse 122. Despite a harsh environment, such as the harsh environment utilized in the collection of data of FIG. 6a, the nature of wideband signals enables a very narrow pulse to be highly correlated between duplicate measurements. For example, the data as shown in FIG. 6a, using 100 combined copies of the same range measurement resulted in 17 dB of the lost SNR.

In the methodology of beamforming as utilized herein, a tracking unit is configured to send a request pulse and is additionally configured to "listen" for a response during a predetermined frame of n time samples. Repeating this k times, and capturing k frames of n time samples, gives a matrix of vectors M where each vector contains the time history for that frame, $$M=\{m_1, m_2, \cdots, m_k\} \qquad (7)$$

where the $i^{th}$ frame of n time samples is $m_i=[m_{i1}, m_{i2}, \ldots, m_{in}]^T$. By assigning a (k×1) vector of ones s as $$s=[1\cdots1]^T \qquad (8)$$

a sum across the frames of data is accordingly as follows:

$$v=Ms/k \qquad (9)$$

where v is the beamformed pulse vector of n time samples. Pulse alignment, traditionally required for beamforming, is not necessary since the frames are snapshots of time that can be directly summed.

Treating this as a beamforming problem, particularly when using UWB short-duration pulses that are highly correlated with one another is beneficial because although the frequency diversity of a UWB signal allows it to penetrate solid structures, such a use also brings distortions and a SNR loss. The repeated measurements all contain the original pulse, however, so the pulses remain correlated with one another, while the noise does not.

Positioning Algorithm and Non-Line-of-Sight (NLOS) Bias Correction

Using a tracking radio, e.g., a desired transmitter as shown in FIG. 1, the position of one or more remote units, e.g., a target receiver, can be monitored by moving such a tracking unit to several known locations surrounding the remote unit. For example as an illustration only, a team of soldiers carrying remote units can maneuver inside a building while a single tracking unit flies overhead in an unmanned aerial vehicle (UAV). Such a tracking unit can then gather ultra-wideband (UWB) range measurements, calculate one or more distances from each known tracking location, and combine the distance measurements into a single remote unit position estimate.

The challenge in finding the location of remote units deployed in buildings or similar harsh environments is that range measurements undergo transit delays when traveling through walls and around corners. These delays create biases or errors in the range measurements and are the most fundamental and limiting source of error in UWB localization. Range measurement biases are caused by non-line-of-sight (NLOS) signal propagation, signal propagation delays through materials other than air, and time-of-flight (TOF) range measurements consisting of travel time plus unknown remote unit processing time. The bias introduced by the unknown processing time is negligible in UWB radios equipped with on-board hardware processing. In UWB systems, the most significant measurement biases arise when a target is located within a room of a building causing the signals to travel through walls or around corners. In this case, every measurement is longer than the actual distance.

Figure 6B:
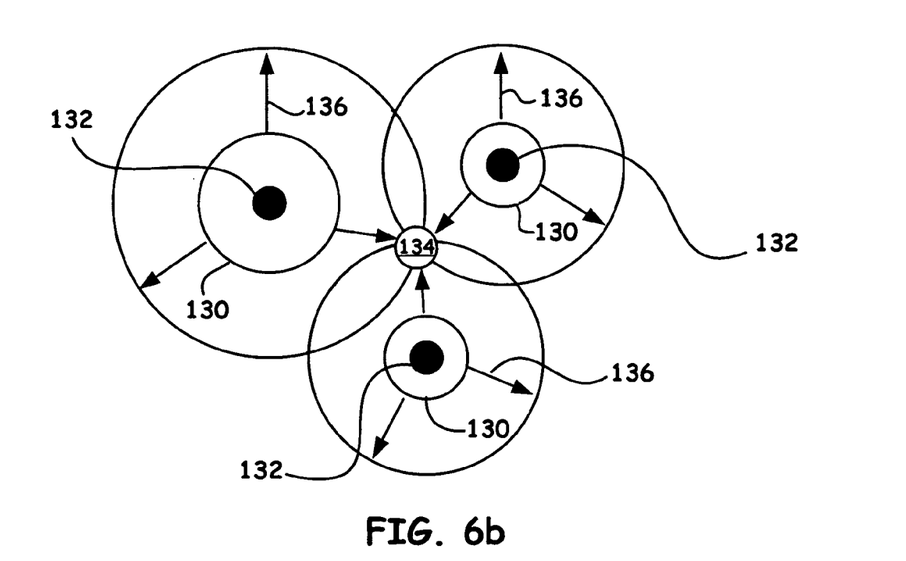
FIG. 6b illustrates range measurement biasing in the present invention.

FIG. 6b illustrates a two step approach to address range measurement biases in the present invention. First, one or more range measurements 130 (five or more) from one or more tracking units 132 are obtained to estimate a desired target 134. Some positioning techniques, such as hyperbolic positioning algorithms, consider five or more range measurements to be an "over-specified" or "over-determined" system that allows multiple ambiguous solutions. As discussed in detail above, the closed-form Smith and Abel algorithm, i.e., "Closed-Form Least Squares Source Location Estimation from Range-Difference Measurements," by J. Smith and J. Abel, IEEE Transactions on acoustics and Speech vol. ASSP-35, no. 12, pp. 1661-1669, 1987, reduces the effect of biases with an overly specified set of range measurements.

In the second step for correcting for measurement bias, as generically shown in FIG. 6b; the solution is recalculated with a range of artificial biases 136 introduced so as to choose the solution with the lowest overall equation error. By taking many range measurements for a target, and by re-calculating the solution with an optimal introduced bias, the deleterious measurement bias is compensated and an estimated position can be tuned to a desired true position.

Example Results

The present invention will be more fully understood by reference to the following example results, which is intended to be illustrative of the present invention, but not limiting thereof.

All of the impulse radios used for all of the experiments to test the methods and apparatus of the present invention have a flat frequency response across 800 MHz to 1.5 GHz using, for example, 50Ω terminated horn antennas. Collected data is often analyzed afterward using MATLAB.

To confirm a meaningful increase in SNR when combining a range collection of measurements into a single beamformed signal, the theoretically predicted SNR gain of a beamformed signal is compared with a measured SNR gain. The theoretical SNR gain predicted by this operation is:

$$SNR\ gain = 20 \cdot \log(\sqrt{k}) \quad (10)$$

where k is the number of iterations. In the methods herein, round-trip TOF range measurements in a highly reverberant volcanic rock cave, first along a clear unobstructed path, and then around a corner several feet beyond a line-of-sight of one another were obtained. For each environment, 128 measurements were repeated and randomly selected from those a range collection varying exponentially in size in powers of two from zero to seven, or from 1 to 128 measurements. For each range collection, the measurements were combined into a beamformed pulse and a SNR gain was calculated as the ratio of SNR of the beamformed signal to the SNR of a single measurement.

Figure 7A:
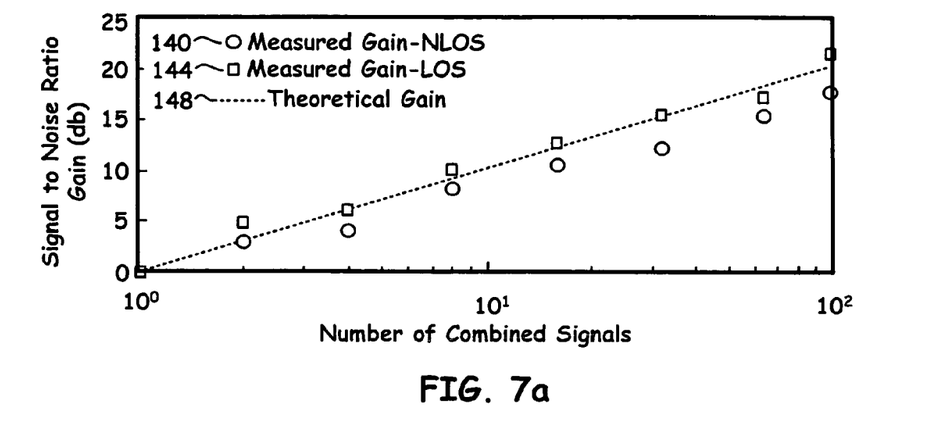
FIG. 7a shows a comparison of theoretical SNR gain prediction with a measured SRN gain in two separate environments FIG. 7b s shows residual error of distance measurements in various environments.

The results for a SNR gain study is found in FIG. 7a, which compares a theoretical SNR gain prediction 148 (shown as a dashed line) with a measured SRN gain in two separate environments, i.e., a non-line-of sight 140 (NLOS) and a line-of site (LOS) 144. With a direct path between radios, the LOS 144 measurements is roughly matched to the theoretical SNR gain prediction 148 to within a few decibels, and with a range collection of 100 measurements, SNR increased by about 20 dB, as predicted. With the radios beyond a line of sight of one another, combining a range collection of 100 gives back 17 dB of the lost SNR, and the gain follows only slightly behind the predicted theoretical value.

System resolution in the present invention is defined herein as the confidence in a range measurement. To find the system resolution, a variance of 500 distance measurements across the same channel was calculated and was utilized in the present example. A single distance measurement was found by combining a range collection into a beamformed signal wherein the pulse arrival time is measured by techniques of the present invention and converted to distance. The test was repeated with the radios separated across two distances: the first an unobstructed direct path with approximately 40 ft. separation and the second from behind a standard sheet-rock wall (4¾ in. thick with a 3½ in. beam and two ⅝ in. sheet-rock slabs) and approximately the same separation.

The two techniques were compared to find the precise arrival time for each of the 500 beamformed pulses. In both, the leading pulse is desired since it travels the most direct route. In the first, a first change in signal energy is searched for by calculating a ratio of short-to long-term signal amplitude above a threshold. In the second peak detection technique, it was assumed that the leading pulse underwent no distortion-causing reflections and thus has the most energy, so the overall maximum signal value is chosen as the arrival time.

To determine the effect that the size of a range collection has on measurement resolution, a total of 1024 single measurements was gathered and randomly selected groups were gathered as range collection whose size varies exponentially in powers of two from one to ten, or from 1 to the full set of 1024 measurements. Using both peak-detection techniques, distance associated to each size range collection and its variance was calculated across all 500 repetitions. Such calculations were repeated in the LOS environment as well as the through-wall environment, and the relationship between the variance in distance with range collection size, as well as transmission channel, and peak-detection technique was compared. From the variance, the resolution, or confidence interval, associated with a distance estimate can be found. Resolution results show an achieved measurement resolution of about 1½ in.

Absolute accuracy was measured by first calibrating the radios in a clear environment at distances with a direct-path and line-of-sight (LOS) transmission, and then by repeating the tests behind several types of walls. All tests took place in an anechoic chamber absorbing electromagnetic radiation room with four walls covered in foam wedges and a linoleum floor. The radios sat facing one another on tripods, and 4 ft. square sections of portable wall were brought into the chamber and placed in-between the radios so as to insure transmission through the test walls and not around. The sheet-rock wall used was standard 4¾ in. thick with a 3½ in. beam and two ⅝ in. sheet-rock slabs. The concrete wall is 8 in. thick with cinderblocks filled with rebar and concrete. The tracking unit was moved in single-foot increments toward the wall with both radios pointed directly at one another, and transmission through the wall and not around.

Figure 7B:
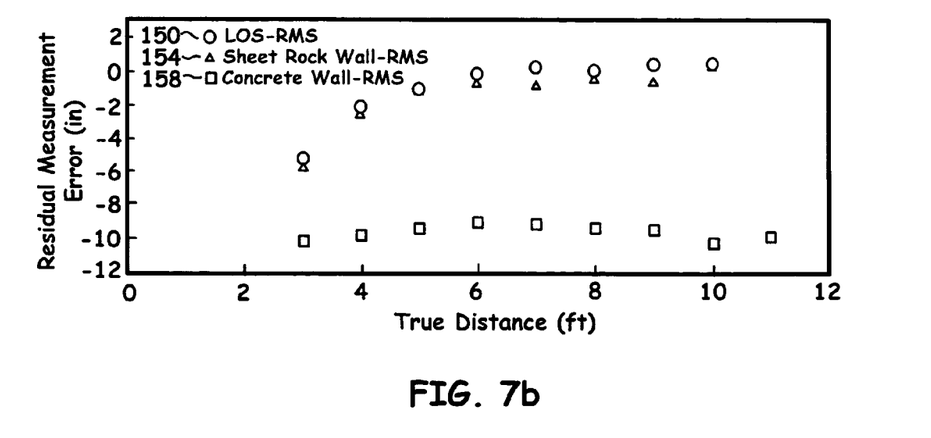

The results for accuracy are plotted in FIG. 7b, which shows residual error of the distance measurements, i.e., for LOS measurements 150, for measurements through sheet rock 154, and for measurements through a concrete wall 158. Behind a sheet-rock wall 154, a slight bias was gained in the measurements, or we measure the distance to be several inches further than it actually is, but still get an RMS error that is within several inches. The bias is due to the change in channel medium, and the signal travels slower through the wall than it would in air. Such a resultant bias, however, can be corrected in the present invention so as to improve range accuracy. The concrete wall 158 results show a more dramatic change in channel medium, and a larger bias of nearly one foot is introduced, with an RMS error of almost 10 inches.

There are many benefits in using the UWB RF technology of the present invention for position localization applications, especially for harsh RF environments. The UWB transceivers as utilized herein, are based on CMOS integrated circuits and are small and low power devices. Because the technology is based on high-frequency electromagnetic (EM) signals, the antennas as configured and as utilized by the present invention are often small for practicality purposes. Finally, the UWB signal is beneficial in that it can be utilized to penetrate walls and such signals perform well in multipath environments.

The methods and apparatus of the present invention enable the recovery of a UWB signal from within difficult operating environments, such as in, but not just limited to, caves or buildings. From the recovered signal, a range can be determined to within several inches or feet and thus a position can be determined to within an equivalent amount.

A limitation of UWB localization and communication systems is the low transmission power imposed by FCC (−42 dBm). UWB is primarily a short range (<500 m) RF technology. However, use of a plurality of transmitters and receivers in a distributed environment can be used to overcome such a limitation. Another limitation in RF signals arises in the attenuation of high frequency EM signals, notably, when signals pass through several thick walls. For applications that require multiple wall penetration, employing the same ranging technique with wide band pulsed RF signals centered at a lower center frequency (for example in the 200-400 MHz range) can be utilized. Finally, the single pulse transmission scheme described herein may limit the number of units to one tracking and one remote. By implementing Transmit Reference encoding schemes developed here at Lawrence Livermore Laboratories (LLNL), each unit could send a uniquely identifying stream of multiple pulses that still adheres to the beamforming advantages described above allowing multiple units in the field simultaneously. Such transmit reference encoding schemes are discussed in detail in pending U.S. patent application Ser. No. 10/631,560, titled, "Multiple-Pulse Multiple Delay Multiple Access Modulation for UWB," to Dowla et al, herein incorporated by reference in its entirety.

Alternative applications beyond traditional tracking includes the remote visualization of the floor plan of a building, such as, the mapping of the walls, hall ways, rooms, etc., using the RF ranging device described here mounted on a moving platform, such as, for example, a mobile robot. The RF range measurements (perhaps in conjunction of the inertial guidance data) can also be used in a 3-D tomographic reconstruction of collapsed structures, for example, for search and rescue missions.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultra-wideband wireless time-of-flight-ranging and network position estimation method, comprising:
   transmitting a first encoded ultra-wideband query;
   transmitting a second encoded ultra-wideband query;
   subtracting out common signals produced from replies to said first and said second encoded ultra-wideband queries so as to result in one or more desired reply signals;
   statistically filtering time of flight information resulting from said desired reply signals so as to produce a plurality of one or more range measurements;
   transforming said one or more range measurements into a desired coherent one or more range measurements;
   introducing a respective bias correction to said coherent signals; and
   calculating a true position estimate of a line-of-sight (LOS) or a non-line-of-sight (NLOS) transmission channel target as a result of processing a predetermined collected number of said filtered and corrected said plurality of range measurements.

2. The method of claim 1, wherein said non-line-of-sight (NLOS) transmission channels comprise at least one target located around corners, inside caves, behind walls, and in buildings.

3. The method of claim 1, further comprising visualizing a floor plan of a building using a ranging device mounted on a moving platform to operate as a transmitter of said encoded ultra-wideband queries.

4. The method of claim 1, wherein said encoded query comprises a single ultra-wideband pulse transmission.

5. The method of claim 1, wherein said encoded query comprises one or more Transmit Reference encoding schemes.

6. The method of claim 1, wherein said position estimation is capable of being determined down to about 1.5 inches.

7. The method of claim 1, wherein the first and second queries are sent to the same receiver.

8. The method of claim 1, wherein statistically filtering time of flight information comprises removing data outliers.

9. The method of claim 1, wherein statistically filtering time of flight information comprises distributing the time of flight information into a histogram having predetermined bin widths, and applying a recursive weighted least squares estimator.

10. The method of claim 1, wherein subtracting out common signals comprises removing reflections of queries that are not replies from a receiver.

11. The method of claim 1, wherein transforming said one or more range measurements into a desired coherent one or more range measurements comprises beamforming.

12. The method of claim 11, wherein beamforming comprises repeating range measurements multiple times and combining the multiple range measurements to enhance coherent reply pulses and minimize uncorrelated noise.

13. The method of claim 12, comprising repeating range measurements at least 100 times.

14. The method of claim 11, wherein beamforming comprises capturing multiple frames of multiple time samples and summing across the frames.

15. The method of claim 14, comprising capturing at least 100 frames.

16. The method of claim 1, wherein introducing a respective bias correction comprises taking multiple range measurements, calculating the position, then recalculating the position with a range of artificial biases, and choosing the solution with lowest overall equation error.

* * * * *